Jan. 27, 1959 A. M. BRENNEKE 2,871,071
PISTON RING ASSEMBLY
Filed Feb. 8, 1955
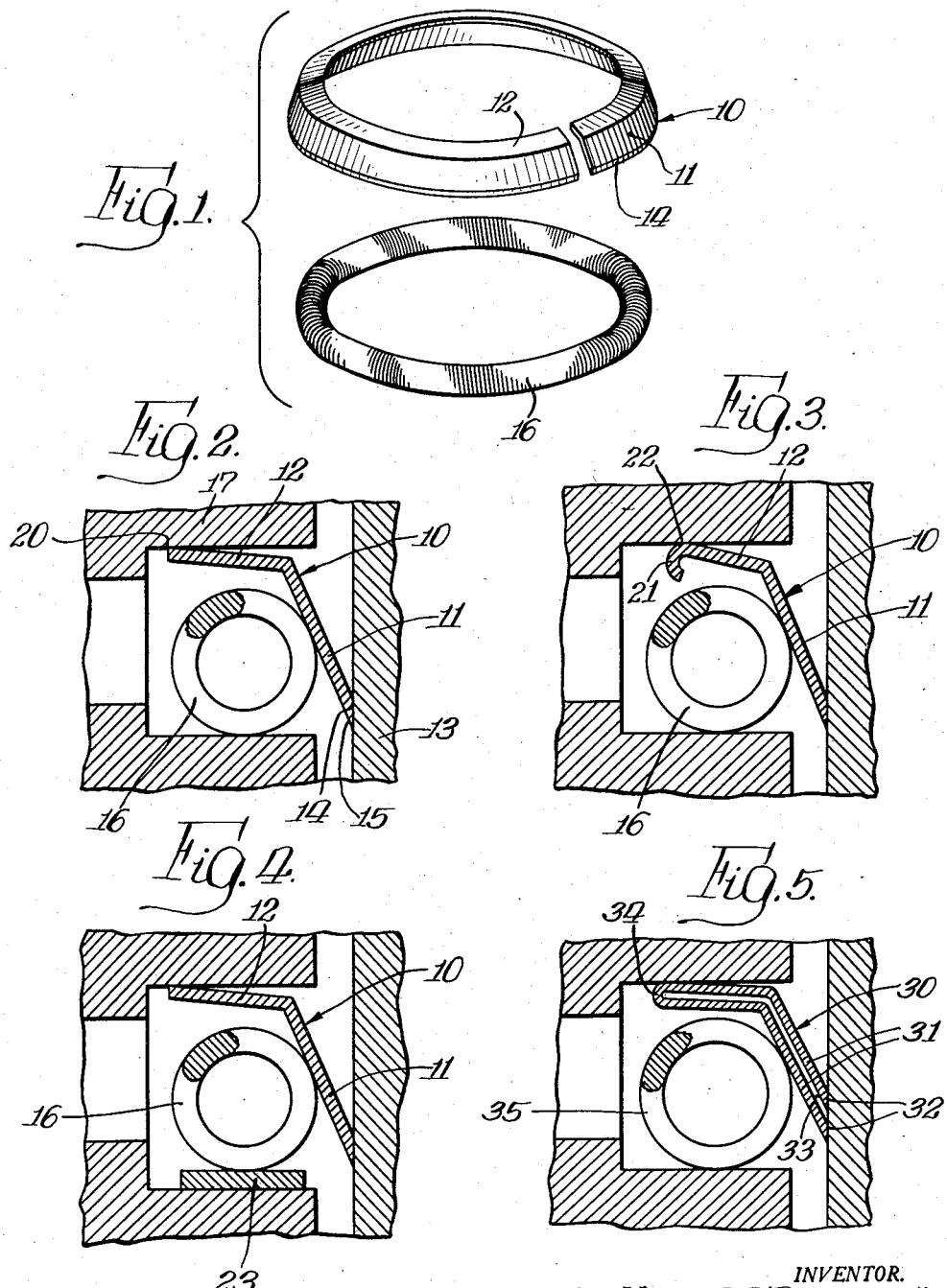
INVENTOR.
Arthur M. Brenneke,
BY
Davis, Lindsey, Hibben & Noyes
Atty's.

United States Patent Office 2,871,071
Patented Jan. 27, 1959

2,871,071

PISTON RING ASSEMBLY

Arthur M. Brenneke, Hagerstown, Ind., assignor to Perfect Circle Corporation, Hagerstown, Ind., a corporation of Indiana Application February 8, 1955, Serial No. 486,834

14 Claims. (Cl. 309—30)

The invention relates generally to piston rings and more particularly to a piston ring assembly adapted for use as an oil ring for an internal combustion engine.

The general object of the invention is to provide a novel piston ring assembly adapted to engage both the cylinder wall and the upper side of the piston ring groove in the piston in sealing relation therewith so that oil is prevented from reaching the combustion chamber portion of the cylinder either along the cylinder wall or through the groove around the ring assembly.

Another object is to provide a novel piston ring assembly which engages both the cylinder wall and the upper side of the ring groove in sealing relation therewith, and in which the pressure against the side of the groove is relatively light, although sufficient to provide the desired seal, so that it does not interfere with attaining proper pressure of the ring against the cylinder wall.

A further object is to provide a novel piston ring assembly constructed so that the sealing pressure against the side of the groove is relatively light during the major portion of the cycle of the engine but is increased when a high vacuum condition exists in the cylinder, thereby preventing oil from being drawn into the cylinder when such condition occurs.

Still another object is to provide a novel piston ring assembly of the foregoing character, which is inexpensive to manufacture, easy to install and has a long life.

Other objects and advantages will become apparent from the following description taken in connection with the accompanying drawing, in which:

Fig. 1 is a perspective view of two parts of a piston ring assembly embodying the features of the invention;

Fig. 2 is a cross sectional view of the ring assembly shown in Fig. 1 and illustrating the ring assembly in position in a groove in a piston and engaging the cylinder wall;

Fig. 3 is a view similar to Fig. 2 but showing a modified form of ring assembly;

Fig. 4 is a view similar to Fig. 2 but showing another modified form of ring assembly; and Fig. 5 is a view similar to Fig. 2 but showing still another modified form of ring assembly.

As mentioned above, a piston ring assembly embodying the features of the invention is adapted to engage both the cylinder wall and the upper side of the piston ring groove in the piston in sealing relation therewith so that oil is prevented from reaching the combustion chamber portion of the cylinder, particularly when high vacuum conditions exist in the cylinder. The pressure against the upper side of the ring groove is normally relatively light so that it does not interfere with proper pressure of the ring assembly against the cylinder wall. Such pressure against the upper side of the groove, however, is augmented by the gas pressure which exists under a high vacuum condition in the cylinder so that adequate side sealing pressure exists during the period when it is particularly needed.

A ring assembly embodying the features of the invention comprises generally a skirt portion, the lower edge of which provides a scraping edge engaging the cylinder wall, and an inwardly directed flange portion extending from the top of the skirt portion. Spring means is provided to engage the skirt portion to force it outwardly and hold its scraping edge in engagement with the cylinder wall. The outward pressure of the spring means on the ring member also tends to tilt it in such a manner that the inner edge of the flange portion is held in sealing engagement with the upper side of the groove. Thus, with the lower edge of the skirt portion engaging the cylinder wall and the inner edge of the flange portion engaging the upper side of the groove, a high vacuum condition within the combustion chamber portion of the cylinder cannot draw oil around the piston ring assembly and into the combustion chamber.

In the embodiment shown in Figs. 1 and 2, the piston ring assembly comprises a ring member indicated generally at 10. The ring member 10 comprises a downwardly extending flange or skirt portion 11 and an inwardly extending flange portion 12. The skirt portion 11 extends downwardly and outwardly while the flange portion 12 extends inwardly and slightly upwardly from the top of the skirt portion 11 so that the ring member is generally L-shape in cross section with the L inverted.

The skirt portion 11 extends downwardly and outwardly so that its lower edge engages the cylinder wall, indicated at 13. While no particular angle between the skirt portion and the cylinder wall is essential, the skirt portion is such that it extends principally downward, the angle between the skirt portion and the cylinder wall shown in the drawing being on the order of 15°. Since the lower edge of the skirt portion 11 is adapted to engage the cylinder wall and the metal from which the ring member is made is relatively thin, the lower edge is preferably beveled as at 14 to give sufficient area to provide a proper seal and a reasonable wear rate. The beveling also forms a relatively sharp oil-scraping edge at 15. Instead of initially forming the bevel 14, the lower edge of the skirt may have such form as results from its initial shaping, and be permitted to wear to a bevel.

The ring member 10 is preferably made of sheet metal which is thinner than that normally used in making sheet metal piston rings, and comprises an elongated strip of material which is bent along a longitudinally extending line to give the L-shape in cross section. The strip is then formed into a circle, thus providing the skirt portion 11 and the inwardly turned flange portion 12. The ring member 10 is preferably dead and exerts no outward pressure on the cylinder wall by itself.

Cooperating with the ring member 10 is a spring means comprising in the present instance a coil spring 16. The spring 16 is located within the angle of the L and bears outwardly against the skirt portion 11, the contact of the spring with the skirt portion being located above the lower edge of the skirt portion. The coil spring is of such length that its ends abut or are held together, and it is preloaded so that it tends to expand circumferentially. Thus the spring 16 pushes outwardly against the skirt portion 11 to hold the scraping edge 15 in contact with the cylinder wall. With such contact, the outward pressure of the spring 16 on the skirt portion 11 also tends to tilt the skirt portion outwardly about the scraping edge 15 as a fulcrum, and thus holds the inner edge of the flange portion 12 in contact with the upper side 17 of the groove, as indicated at 20. While the outward pressure of the spring 16 is utilized chiefly to hold the scraping edge 15 in engagement with the cylinder wall, the tendency of the ring member to tilt under such pressure is sufficient to produce a light constant axial load at the point 20 to provide a seal at that point.

Thus the scraping edge 15 of the skirt 11 provides a seal with the cylinder wall while the inner edge of the flange portion 12 provides a seal with the upper side of the groove 20, so that when a high vacuum condition exists in the upper part of the cylinder, no oil is permitted to flow upwardly beyond the ring member 10. When such condition exists, the pressure of the scraping edge 15 against the cylinder wall and the inner edge of the flange portion 12 against the upper side of the groove by the spring 16 is augmented by the gas pressure on the lower side of the ring member 10, and such pressure acts on the entire area of the ring member 10. The ring assembly has a relatively long life since substantially all the skirt portion 11 below the point where the spring 16 contacts may be worn away before the ring need be discarded.

While the ring member 10 is dead and exerts no outward pressure by itself, it is highly flexible and hence readily conforms to the shape of the cylinder from the action of the spring. This characteristic is obtained without producing any areas of excessively high pressure against the cylinder wall, so that scuffing is thereby avoided. The avoidance of high pressure areas due to the flexibility of the ring member also reduces the rate of wear of the ring member so that not only does it have a relatively large portion which can be worn away before it need be discarded but also its rate of wear is low.

The construction shown in Fig. 3 of the drawing is similar to that shown in Fig. 2 except that the inner edge of the flange portion 12 is downwardly curved to form a bead 21 around the inner periphery of the flange portion, thus providing a rounded surface 22 to contact the upper side of the ring groove. During expansion and contraction of the ring member 10 in operation, the rounded surface 22 rides smoothly on the upper side of the groove with a minimum of friction. The rounded surface 22, since it contacts the upper side of the groove, forms a seal at that point in the same manner as at 20 in Fig. 2.

If the piston is made of a material which tends to wear on its lower side under the action of the spring 16, a washer element comprising a steel rail 23, as shown in Fig. 4, may be placed on the lower side of the groove to form a seat for the spring 16. The rail 23 not only retards groove wear by the spring but also reduces radial friction between the spring and the side of the groove so that the spring can freely expand and contract.

In the modified embodiment of the invention shown in Fig. 5, the ring member, indicated generally at 30, is even more flexible than the forms previously described and hence is more conformable to the cylinder. For this purpose, it is of double layer construction. Thus the ring member 30 is provided with a pair of skirt portions 31, the lower edges of which may be beveled as at 32 to provide a pair of scraping edges engaging the cylinder wall. The skirt portions 31 are arranged one overlying the other and are preferably slightly spaced from each other, as indicated at 33, so that the scraping edges 32 are axially spaced.

The ring member 30 is preferably formed from a strip of sheet metal which is of less thickness than the metal used in the preceding forms and is reversely folded upon itself to provide the double layer construction. The fold is at the inner edge of the flange portion as indicated at 34 and the fold is so rounded that both layers of the flange portion and the two skirt portions are held slightly spaced from each other to form the space 33. The form of the fold also provides a rounded edge for engagement with the upper side of the groove so that friction therebetween is held to a minimum. The spring means, which in this instance is indicated at 35, is of the same construction as in the preceding forms and bears outwardly against the inner or lower skirt portion 31. The spring 35 thus functions in substantially the same manner as in the previous forms and holds the skirt portions 31 in engagement with the cylinder wall and the curved fold 34 in engagement with the upper side of the groove to provide a seal at that point.

From the foregoing description, it will be apparent that I have provided a novel piston ring assembly adapted to engage both the cylinder wall and the upper side of the ring groove in the piston in sealing relation therewith. Oil is thus prevented from reaching the combustion chamber portion of the cylinder, either along the cylinder wall or through the groove. The pressure of the ring member against the upper side of the groove is relatively light but sufficient to provide the desired sealing action, and such sealing action is augmented by the gas pressure when a high vacuum condition exists in the cylinder. It is obvious that the ring assembly disclosed herein is inexpensive to manufacture and may be easily installed.

I claim:

1. A piston ring assembly for a piston having a groove with upper and lower sides, comprising a ring member comprising an inwardly extending flange adapted to be positioned adjacent the upper side of the groove and a flange extending downwardly therefrom to adjacent the lower side of the groove, the lower edge portion of the downwardly extending flange being adapted to contact the cylinder wall, and spring means bearing outwardly against the downwardly extending flange above the lower edge thereof to force the lower edge portion against the cylinder wall and to tilt the ring member to hold the inner edge portion of said inwardly extending flange against the upper side of the ring groove.

2. A piston ring assembly for a piston having a groove with upper and lower sides, comprising a ring member having a downwardly and outwardly extending edge portion adapted to bear against the cylinder wall adjacent the lower side of the groove and an inwardly extending edge portion adapted to be positioned adjacent the upper side of the ring groove, and spring means for holding said first-mentioned edge portion against the cylinder wall and to tilt said ring member to hold the second-mentioned edge portion against the upper side of the groove.

3. A piston ring assembly for a piston having a groove with upper and lower sides, comprising a ring member generally L-shape in cross section with one edge portion extending downwardly and outwardly to engage the cylinder wall adjacent the lower side of the groove, and the other edge portion extending inwardly and upwardly to engage the upper side of the ring groove at the inner part of the groove, and spring means within the angle of the L for holding said edge portions respectively in engagement with the cylinder wall and the upper side of the groove.

4. A piston ring assembly for a piston having a groove with upper and lower sides, comprising a ring member forming an obtuse angle in radial cross section with one side of the angle at the upper side of the ring groove, and the other side of the angle extending downwardly and outwardly for the major portion of the width of the groove, and spring means between said sides and bearing against said other side for holding said sides respectively against the upper side of the groove and against the cylinder wall.

5. A piston ring assembly for a piston having a groove with upper and lower sides, comprising a ring member comprising a downwardly and outwardly flaring skirt of an axial width substantially equal to the width of the groove with its lower edge adapted to engage the cylinder wall and means extending from the upper margin of the skirt for engaging the upper side of the ring groove, and a spring engaging said skirt for holding said edge against the cylinder wall and for holding said means against the upper side of the groove.

6. A piston ring assembly for a piston having a groove with upper and lower sides, comprising a ring member comprising a strip of sheet metal bent along a longitudinal line to provide a skirt portion of an axial width substantially equal to the width of the groove for engaging the cylinder wall and a flange portion for engaging the upper side of the ring groove, and spring means for holding said portions in such engagement and adapted to be supported by the lower side of the groove.

7. A piston ring assembly for a piston having a groove with upper and lower sides, comprising a ring member having a skirt extending downwardly and outwardly at a small angle to the axis and having an axial dimension substantially equal to the width of the groove and having its lower edge beveled to provide an oil scraping edge directed principally downward for scraping oil from the cylinder wall, said member also having means extending from the upper portion of the skirt for engagement with the upper side of the groove, and spring means engaging the skirt for holding said scraping edge against the cylinder wall and said means against the upper side of the groove.

8. A piston ring assembly for a piston having a groove with upper and lower sides, comprising a ring member having a skirt portion extending downwardly and outwardly for engaging the cylinder wall adjacent the lower side of the groove, and a flange portion extending inwardly and upwardly for positioning its inner edge against the upper side of the groove, and a coiled spring bearing outwardly against said skirt portion, the skirt portion being positioned so that the major component of force exerted by the spring is perpendicular to the skirt portion.

9. A piston ring assembly for a piston having a groove with upper and lower sides, comprising a ring member having a skirt portion adapted at its lower edge to engage the cylinder wall adjacent the lower side of the groove, and a flange portion at the top of the skirt extending inwardly and upwardly therefrom and adapted at its inner edge to engage the upper side of the groove, and spring means spaced downwardly from said flange portion and bearing outwardly against said skirt portion to hold the lower edge thereof against the cylinder wall and tending to tilt the member to hold the inner edge of the flange portion against the upper side of the groove.

10. A piston ring assembly for a piston having a groove with upper and lower sides, comprising a generally L-shape ring member comprising two layers providing on one leg of the L a pair of adjacent oil scraping edges adapted to engage the cylinder wall, the other leg of the L being adapted to engage one side of the groove, and spring means within the L and bearing outwardly against the inner layer of said one leg.

11. A piston ring assembly for a piston having a groove with upper and lower sides, comprising a ring member having a double layer flange portion adapted to be positioned in the upper part of the groove, and a pair of skirt portions one overlying the other and extending downwardly and outwardly from the respective layers of the flange portion, the lower edges of the skirt portions forming a pair of cylinder engaging edges, and spring means bearing outwardly against the inner skirt portion.

12. A piston ring assembly according to claim 11 in which the skirt portions are slightly spaced from each other to hold the cylinder engaging edges thereof in axially spaced relation.

13. A piston ring assembly according to claim 11 in which the ring member comprises a strip of sheet metal reversely folded upon itself to form the double layer flange portion and the pair of skirt portions, and in which the fold holds the layers of the flange portion and the pair of skirt portions in slightly spaced relation.

14. A piston ring assembly according to claim 2, in which said inwardly extending edge portion is curved downwardly to provide a rounded surface adapted to engage the upper side of the groove.

References Cited in the file of this patent

UNITED STATES PATENTS

| | | |
|---|---|---|
| 1,173,319 | Small | Feb. 29, 1916 |
| 1,360,967 | Marshall | Nov. 30, 1920 |
| 1,435,223 | French | Nov. 14, 1922 |
| 2,229,578 | Malpas | Jan. 21, 1941 |

FOREIGN PATENTS

| | | |
|---|---|---|
| 4,571 | Great Britain | Mar. 8, 1884 |